United States Patent [19]
Cardwell

[11] Patent Number: 4,872,719
[45] Date of Patent: Oct. 10, 1989

[54] TRUCK RAIL ARRANGEMENT

[76] Inventor: Billy L. Cardwell, 2209 Post Oak, Belton, Tex. 76513

[21] Appl. No.: 222,034

[22] Filed: Jul. 21, 1988

[51] Int. Cl.⁴ .......................................... B62D 33/02
[52] U.S. Cl. ..................................... 296/34; 296/32;
  296/36; 403/22; 403/43; 403/44; 403/46;
  403/60; 410/110; 410/116; 256/67
[58] Field of Search ..................... 296/36, 32, 34, 43,
  296/3; 105/379, 380; 403/43, 44, 45, 46, 22, 60;
  410/101, 104, 106, 108, 110, 116; 248/231.2;
  256/67

[56] References Cited

U.S. PATENT DOCUMENTS

| | | | |
|---|---|---|---|
| 2,665,489 | 1/1954 | Cunningham | 403/44 X |
| 3,283,909 | 11/1966 | Daubman | 403/43 X |
| 3,765,713 | 10/1973 | Suitt | 296/3 |
| 4,063,833 | 12/1977 | Strong | 403/60 |
| 4,248,558 | 2/1981 | Lechner | 410/104 |
| 4,398,763 | 8/1983 | Louw | 296/3 |
| 4,475,840 | 10/1984 | Schmitt et al. | 256/67 X |
| 4,604,013 | 8/1986 | Elwell et al. | 410/106 |
| 4,786,201 | 11/1988 | Huetter et al. | 403/44 X |

FOREIGN PATENT DOCUMENTS 1220537  5/1960  France ................................. 403/43

Primary Examiner—Johnny D. Cherry
Assistant Examiner—Andrew C. Pike
Attorney, Agent, or Firm—Leon Gilden

[57] ABSTRACT

Truck rails for pickup trucks and the like include the use of swivel connectors which permit the rails to be attached concurrently to the truck sides, headache rack, and tool box.

1 Claim, 2 Drawing Sheets

TRUCK RAIL ARRANGEMENT

BACKGROUND OF THE INVENTION

1. Field of the Invention

The present invention relates to truck rails, and more particularly pertains to a new truck rail design which permits the rails to be concurrently connected if desired to a headache rack, tool box and truck side panels.

2. Description of the Prior Art

Removable truck rail assemblies heretofore devised and utilized for the purpose of providing side support on truck beds are known to consist basically of familiar, expected and obvious structural configurations. In this regard the myriad of designs encompassed by the prior art have been developed for the fulfillment of countless objectives and requirements. However, the truck rail assembly according to the present invention substantially departs from the conventional concepts and designs of the prior art, and in so doing provides an apparatus primarily developed for the purpose of facilitating a versatile and rapid connection of a rail assembly to truck side panels, headache racks, and tool boxes.

More particularly, removable truck rail assemblies are well known in the prior art. For example, reference is made to U.S. Pat. No. 4,231,606, which issued to R. Tuerk on Nov. 4, 1980, wherein a conventional and well accepted truck stake arrangement is disclosed. With reference to this patent, it will be noted that conventional truck stake assemblies are typically attached to truck side panels by the positioning of one or more stakes in apertures formed along top edges of the panels. While being functional for their intended purpose, these side panel constructions frequently lack substantial stability and can be easily jarred loose from the truck bed in response to sudden jolts to the truck main frame structure. As such, it can be appreciated that there exists a continuing need for new and improved apparatuses and methods for more securely attaching truck side rail assemblies to truck beds and in this respect, the present invention substantially fulfills this need.

SUMMARY OF THE INVENTION

In view of the foregoing disadvantages inherent in the known types of truck rail assemblies now present in the prior art, the present invention provides an improved removable truck rail assembly construction wherein the same can be more securely attached to a truck bed through the use of self tightening connectors which allow the rail assembly to be concurrently attached to either a headache rack or tool box, or both, if such are present on the truck. Accordingly, the general purpose of the present invention, which will be described subsequently in greater detail, is to provide a new and improved removable truck rail assembly which has all the advantages of the prior art removable truck rail assemblies and none of the disadvantages.

To attain this, the present invention makes use of a novel connector design which facilitates the attachment of a rail assembly to a truck side panel. More specifically, at least one free end of each rail is provided with an axially aligned swivelable T-connector which is positionable within a slot formed on a headache rack at the rear of the truck cab. A bottom surface of the T-connector includes small downwardly extending integral pointed members which grip an interior surface of the slot into which it is inserted after a partial rotation thereof, and a threaded tightening of the the T-connector relative to the rail member is then achieved in a conventional manner. Additionally, a plurality of rectilinearly-shaped removable connectors having similar threadably movable T-connectors on opposed ends thereof are designed to be attached between a bottom surface of a rail and a top edge of a truck side panel. In this regard, one end of a removable connector is positioned within a rectangular slot formed on the top of a truck side panel and the opposed end T-connector is positionable within an axially aligned T-shaped slot formed on a bottom of a rail. The slot facilitates a movable positioning of the connector relative to the rail and the aperture formed in the truck side panel, and with the T-connectors being reverse threaded, a clockwise rotational movement of the connector effects a concurrent tightening of both oppositely directed T-members so as to securely fasten a rail member to the truck side panel. Further side positioned T-shaped slots may be provided to facilitate the use of further connectors so as to permit an attachment of the rail to a truck tool box or some other structure as desired.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out IN various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck rail assembly which has all the advantages of the prior art truck rail assemblies and none of the disadvantages.

It is another object of the present invention to provide a new and improved truck rail assembly which may be easily and efficiently manufactured and marketed.

It is a further object of the present invention to provide a new and improved truck rail assembly which is of a durable and reliable construction.

An even further object of the present invention is to provide a new and improved truck rail assembly which is susceptible of a low cost of manufacture with regard to both materials and labor, and which accordingly is then susceptible of low prices of sale to the consuming public, thereby making such truck rail assemblies economically available to the buying public.

Still yet another object of the present invention is to provide a new and improved truck rail assembly which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
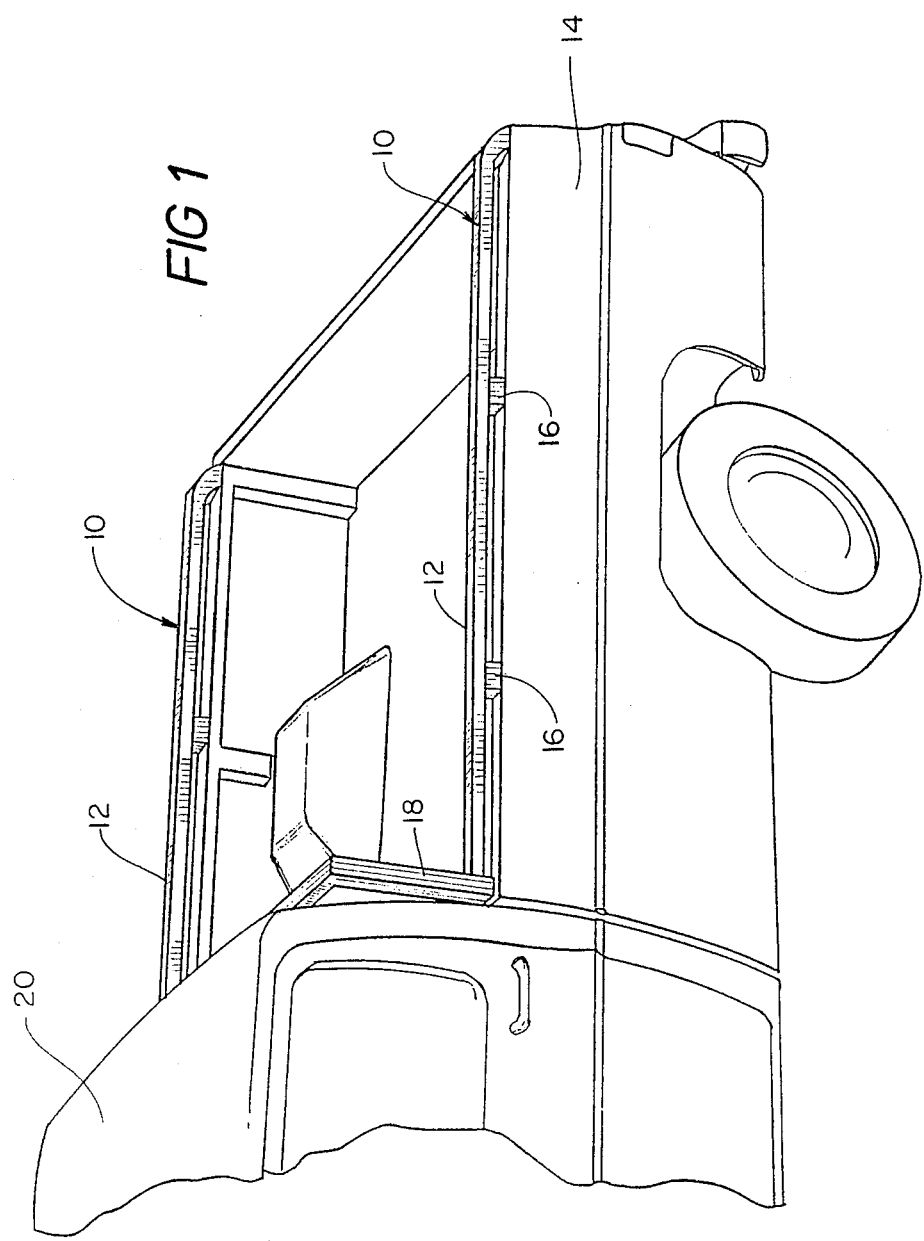
FIG. 1 is a partial perspective view of a pickup truck showing the rail assembly comprising the present invention operably attached thereto.

With reference now to the drawings, and in particular to FIG. 1 thereof, a new and improved truck rail assembly embodying the principles and concepts of the present invention and generally designated by the reference numeral 10 will be described.

More specifically, it will be noted that the rail assembly 10 includes an elongated rail member 12 attachable to the top of a truck side panel 14 through the use of one or more connectors 16. Further, a particular rail member 12 may be attached to a conventional headache bar or rack 18 operably secured rearwardly of a truck cab 20.

Figure 2:
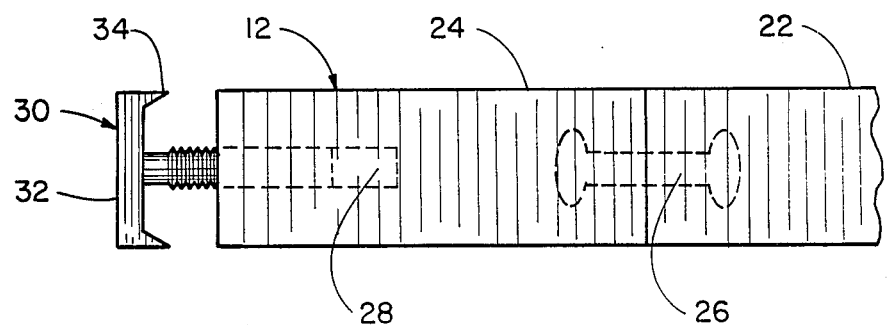
FIG. 2 is a partial elevation view illustrating the swivelable connector end of a particular rail.

FIG. 2 illustrates the particular construction of the connection means associated with a rail 12. As shown, the end 22 of a rail 12 includes a relatively rotatable, axially aligned section 24. The rotatable section 24 is attached to the rail member 22 by a mushroom-shaped metallic member 26 retained within apertures located in the abutting end portions of the members 22, 24. The unillustrated apertures are of a conventional design, and conventional semi-circular metal mounting plates are positioned on opposed sides of the mushroom-shaped metal member 26 to hold it in position. In this respect, a pair of the semicircular metal plates may be fastened to the end of the rail member 22 and a similar set of the plates are fastened to the rotatable member 24 so as to retain the bearing member 26 in position in a well known manner. This facilitates the attachment of the member 24 to the rail 22 while permitting relative rotation therebetween. The bearing connectors 26 are commercially available and no further discussion thereof is provided.

With further reference to FIG. 2, it will be observed that the opposed end of the rotatable member 24 is provided with an axially aligned threaded opening 28 designed to receive a threaded connector 30 in the illustrated manner. The threaded connector 30 includes a rectangularly-shaped head 32 having one or more downwardly extending integral pointed sections 34. The pointed members 34 are designed to grip an interior surface of an aperture formed in the truck side panel 14 or some other convenient location, such as in the truck cab, headache bar, tool box, or the like, and prevent rotation of the threaded connector 30 during a concurrent rotation of the rotatable member 24. This manner of assembly will be subsequently described in greater detail.

Figure 3:
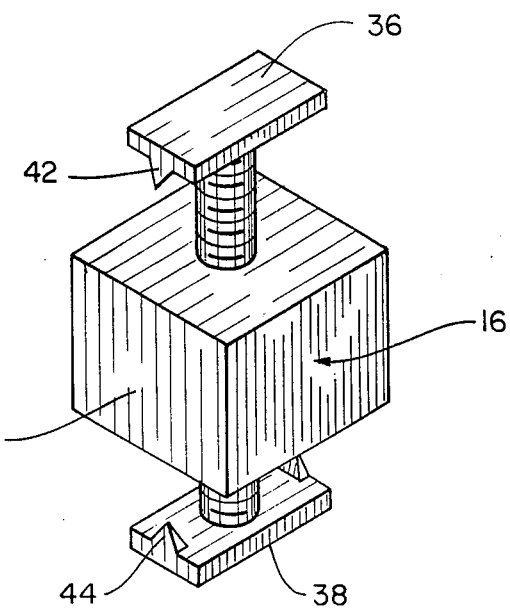
FIG. 3 is a perspective view of a removable connector forming a part of the present invention.

FIG. 3 of the drawings illustrates the construction of one of the removable connectors 16 associated with the invention. As shown, a connector 16 includes the use of a pair of threaded members 36, 38 threadably received within a block member 40. The head of the rectangularly shaped threaded member 36 includes a plurality of downwardly projecting pointed sections 42, and the rectangularly shaped connector 38 also has upwardly extending pointed members 44. The threaded connectors 36, 38 are reversely threaded in the block member 40 so that a clockwise rotation thereof will result in both threaded connectors being moved concurrently inwardly towards the block member. By the same token, a counterclockwise rotation of the block member 40 will result in the concurrent threaded extension of connectors 36, 38 from the member.

Figure 4:
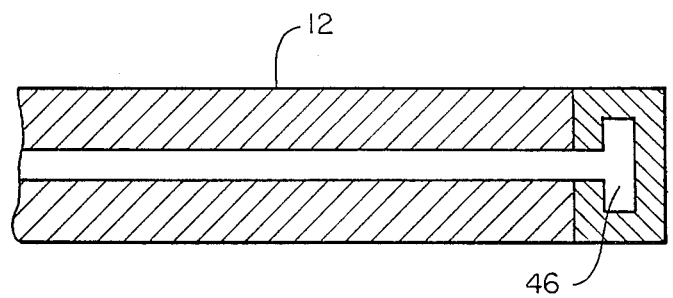
FIG. 4 is a partial bottom plan view of a rail comprising a part of the present invention.

FIG. 4 of the drawings illustrates the bottom construction of a rail member 12 wherein a T-shaped slot 46 is positioned along an axial length thereof. The T-shaped slot 46 is designed to receive the heads of one of the threaded connectors 36, 38 in the manner described below.

With respect to the manner of usage and operation of the present invention, it can be appreciated that a truck cab 20 and side panels 14 may be provided with rectangularly-shaped apertures at convenient locations. By the same token, a headache bar or rack 18 may be provided with such rectangularly shaped apertures and, if available, a pickup truck type tool box may also have such apertures cut therein. During the assembly of the invention 10 the connector 30 may be inserted into one of the rectangularly shaped slots on a tool box, headache bar 18, or truck cab 20, and by a manual rotation of the member 24, the threaded member 30 will be drawn into abutment therewith to effectively lock the rail 12 in position thereagainst. With one or more of the connectors 16 having a first threaded member 36 positioned in the T-shaped slot 46 of a rail 12, the rail may be secured to the truck side panel 14 by dropping the other threaded member 38 through an aperture already present in the panel. Of course, the connector 16 may be aligned with the side panel aperture by sliding the same along the slot 46 in a now apparent manner. Once both threaded members 36, 38 are in position, a clockwise rotation of the connector 16 will result in the tightening of the threaded members so as to further secure the side rail 12 to the vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved truck rail assembly comprising:

rail means for attachment to a top surface of a truck bed in a cargo supporting position; and first connector means for connecting said rail means to said truck bed, said first fconnector means including a first threaded connector threadedly extensible relative to said first connector means and a second threaded connector threadably extensible relative to said first connector means and being oppositely disposed from said first threaded connector, said first threaded connector being engageable with said rail means and said second threaded connector being engageable with said truck bed, and wherein said first threaded connector is reversibly threaded relative to said second threaded connector, whereby a rotation of a body portion of said first connector means results in said first and second threaded connectors moving concurrently into or out of said body portion depending upon a direction of rotation thereof, and wherein said first and second threaded connectors are provided with engagement means to prevent relative rotation thereof respectively with said rail means and said truck bed, and wherein said engagement means includes, a first pair of pointed members each orthogonally formed on said first connector, and a second pair of pointed members orthogonally formed on said second connector wherein said first and second pair of pointed members engage surface portions of said rail means and said truck bed.

* * * * *